United States Patent [19]

Brooker et al.

[11] Patent Number: 4,543,290
[45] Date of Patent: Sep. 24, 1985

[54] CHEMICAL RESISTANT DECORATIVE LAMINATES

[75] Inventors: Lenon G. Brooker, Hampton; Donald L. Jarrell, Early Branch, both of S.C.

[73] Assignee: Westinghouse Electric Corp., Pittsburgh, Pa.

[21] Appl. No.: 574,307

[22] Filed: Jan. 26, 1984

[51] Int. Cl.[4] .......................... B32B 27/42; C09J 5/02
[52] U.S. Cl. .................................. 428/336; 428/413; 428/503; 428/506; 156/87; 156/308.4; 427/391
[58] Field of Search ................ 428/336, 413, 503, 506

[56] References Cited

U.S. PATENT DOCUMENTS

| 3,177,090 | 4/1965 | Bayes et al. | 428/506 X |
| 3,266,971 | 8/1966 | Miller, Jr. | 428/503 |
| 3,345,248 | 10/1967 | Pounds et al. | 428/503 |
| 3,841,956 | 10/1974 | Palazzolo et al. | 428/503 X |

Primary Examiner—Patricia C. Ives
Attorney, Agent, or Firm—Daniel P. Cillo

[57] ABSTRACT

A resin impregnated and coated, fibrous, chemical resistant decorative laminate is made, having a bottom portion impregnated with phenolic resin, a top portion impregnated and coated with vinyl ester terminated bisphenol A epoxy resin, and a middle portion impregnated with aminotriazine-aldehyde resin which acts as a barrier to phenolic resin contact with the vinyl ester terminated bisphenol A epoxy resin.

16 Claims, 1 Drawing Figure

U.S. Patent  Sep. 24, 1985  4,543,290
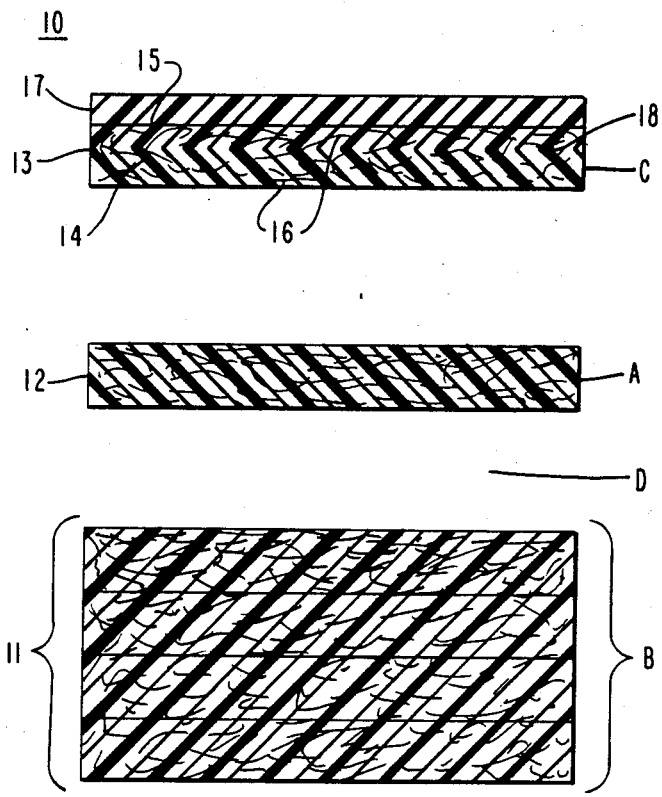

CHEMICAL RESISTANT DECORATIVE LAMINATES

BACKGROUND OF THE INVENTION

Decorative laminated plastics are commonly used as the surface material in the fabrication of countertops, table tops, interior and exterior wall panels, and other articles for residential and commercial use. The extensive use of laminated plastics in these applications is primarily due to their low cost, durability, impact and abrasion resistance, decorative clarity, resistance to heat and ultraviolet light, and resistance to mild chemicals.

Miller, in U.S. Pat. No. 3,266,971, taught improved clarity and smoothness characteristics of laminate surfaces, by use of a coating resin on the dried top surface of melamine-formaldehyde impregnated decorative print or protective overlay sheets. The coating resin, applied in the range of about 5 to 15 grams per square foot, contains a mixture of acrylic latex made from an alkyl ester of methacrylic acid; trialkyl monoamine; and a cross-linking agent selected from polyalkyl ethers of polymethylolmelamine or cycloaliphatic epoxy resins of the 3,4-epoxycyclohexylmethyl-3,4,epoxycyclohexane carboxylate type.

Pounds et al., in U.S. Pat. No. 3,345,248, taught improved wear, craze, and ultraviolet resistance for outdoor laminates, by use of a separate non-porous overlay sheet of polymethylmethacrylate, plasticized with styrenes or alkylacrylates, on top of a "B"-staged melamine-formaldehyde decorative print sheet. While these advances in the laminate art have solved many laminate problems, the single major deficiency of decorative laminates, resistance to strongly corrosive chemicals such as strong acids, bases, oxidizing agents, and powerful solvents, remains to be solved. Because of this deficiency, the use of decorative laminated plastics has been prohibited in environments where they are subject to being exposed to corrosive chemicals, such as in industrial laboratories, and in some hospital and school environments.

SUMMARY OF THE INVENTION

The above need has been met and the above problem solved by providing a decorative laminate comprising, in its broadest aspect, a bottom core portion impregnated with phenolic resin, a top decorative portion impregnated and coated with a vinyl ester terminated bisphenol A epoxy resin, and a middle portion impregnated with aminotriazine-aldehyde resin; where the aminotriazine-aldehyde resin functions as a barrier to phenolic resin contact with the vinyl ester terminated epoxy. The epoxy coating is at least about 1 mil thick and epoxy impregnation into the top decorative portion is at least about 1 mil.

More specifically, the laminate, in its preferred embodiment, comprises a bottom phenolic resin impregnated core layer; a melamine resin impregnated barrier sheet; and a top decorative print sheet, having a surface in contact with the barrier sheet, and having its top surface impregnated and coated with a vinyl ester terminated bisphenol A epoxy resin having a viscosity over about 400 cps. at 25° C. Thus, in the laminate, there is a layer of melamine resin between the phenolic resin in the bottom core and the vinyl ester terminated bisphenol A epoxy resin at the top of the print sheet. Optionally the print sheet can be impregnated with melamine resin before coating and impregnating with vinyl ester terminated bisphenol A epoxy resin, to improve abrasion resistance.

In the method of this invention utilizing melamine print impregnation, the melamine resin is impregnated into the print sheet and immediately thereafter, without drying, the vinyl ester terminated bisphenol A epoxy is coated onto the top surface of the print sheet, to permeate the top $\frac{1}{4}$ of the print sheet, and to be absorbed into it and mix and interact with the melamine resin. In all cases, the vinyl ester terminated bisphenol A epoxy is applied at a rate of from about 10 grams to about 25 grams per square foot of print sheet. The coated and impregnated print sheet is then heated and dried to the "B"-stage and can be stored until needed.

The vinyl ester terminated bisphenol A epoxy alone or in combination with the melamine resin imparts chemical resistance, craze resistance, hardness and toughness to the laminate not attainable by use of melamine resin alone. Laminates utilizing this coated and impregnated protective overlay sheet resist bases, such as 50% sodium hydroxide, acids, such as concentrated sulfuric acid and concentrated hydrochloric acid, and solvents such as acetone.

BRIEF DESCRIPTION OF THE DRAWING

For a better understanding of the invention, reference may be made to the preferred embodiments exemplary of the invention, shown in the accompanying drawing, which is a cross-sectional view of one embodiment of a chemical resistant decorative laminate stack-up showing the coating and resin impregnation in the top layer.

DESCRIPTION OF THE PREFERRED EMBODIMENTS

Referring now to the FIGURE, one embodiment of a decorative laminate stack-up 10 is shown, as it might be placed in a press to be heat and pressure consolidated. The stack-up comprises core 11, barrier layer 12 and resin treated decorative print layer 13. The core 11 will generally contain from about 2 to 8 sheets of Kraft paper or the like, impregnated with a phenolic resin. These resins are conventionally obtained by reacting a phenolic substance such as phenol itself, substituted phenols, i.e., alkyl phenols such as cresols, xylenols, tertiary alkyl phenols, and the like, or mixtures of such phenolic substances with an aldehyde such as formaldehyde, acetaldehyde, propionaldehyde, benzaldehyde, furfural, and the like, or with mixtures of such aldehydes, either alone or in the presence of other aldehyde-reactable substances such as urea, thiourea, substituted ureas and thioureas, aminotriazines, and the like.

Barrier layer 12 will usually be a single sheet of Kraft paper or alpha-cellulose paper, impregnated with an aminotriazine-aldehyde resin, usually a melamine-formaldehyde resin. The top decorative print sheet 13 will be a single sheet of alpha-cellulose paper which can be optionally dual treated with an aminotriazine-aldehyde impregnating resin 14, usually a melamine-formaldehyde resin, and a protective vinyl ester terminated bisphenol A epoxy resin 15, which saturates into the print sheet via the alpha-cellulose paper fibers shown as 16, and also forms a clear, uniform, continuous, non-fibrous, non-porous, non-patterned coating layer 17 on the top surface of the print sheet 13. The print sheet in this embodiment will have a solid color caused by dyeing or pigmenting the sheet.

As can be seen, in the optional embodiment described above, the top print sheet has its aminotriazine-aldehyde impregnated surface facing the phenolic resin of the core, and in some instances that thickness of aminotriazine-aldehyde resin is enough of a barrier between the phenolic and the vinyl ester terminated epoxy to prevent cure inhibition of the epoxy by the phenolic resin, thus allowing elimination of the separate barrier layer 12. While the dual impregnated embodiment provides improved abrasion resistance, a low cost embodiment, still having very good abrasion resistance and outstanding chemical resistance, can eliminate melamine impregnation into the print sheet 13 and utilize only the vinyl ester terminated bisphenol A epoxy as both coating layer 17 and impregnating layers 14 and 15, relying solely on melamine in barrier layer 12 to prevent phenolic contact.

The aminotriazine-aldehyde resins which can be used to impregnate the print and barrier sheets are well known in the art. Melamine is the preferred aminotriazine reactant for preparing the aminotriazine-aldehyde but other aminotriazines, i.g., mono-, di-, and tri-substituted melamines, such as the mono-, di-, and trimethylmelamines, and the like; guanamines, as well as mixtures of aminotriazines, may also be utilized as reactants. Similarly, formaldehyde, either as such or as an aqueous solution, is the preferred aldehyde reactant, but other aldehydes, i.e., acetaldehyde, propionaldehyde, butyraldehyde, and the like may also be employed. Usually the mole ratio of aldehyde:aminotriazine will be between about 1.5:1 to 4:1. The usual solvent for these resins is either methyl alcohol or isopropyl alcohol.

If desired, the thermosetting aminotriazine-aldehyde resin may be modified by the addition thereto of effective amounts of plasticizers such as α-alkyl-D-glucosides, i.e., α-methyl-D-glucoside, glycols, guanamines, or methylol derivatives of sulfonamides. In addition, the thermosetting aminotriazine-aldehyde resin may also contain effective amounts of commonly employed curing catalysts, such as phosphoric acid, phthalic acid, p-toluenesulfonic acid, and the like. Reference may be made to U.S. Pat. No. 3,392,092 for exhaustive details on their production. Similarly, complete details on the phenolic resins used to impregnate the core sheet can be found in U.S. Pat. Nos. 2,205,427; 2,315,087; 2,328,592 and 2,383,430.

The barrier sheet, if used, and the core sheets are impregnated using standard techniques. The barrier sheet will be impregnated with a solution of aminotriazine-aldehyde resin to give a resin content of at least about 30 weight percent and preferably between 45 percent and 75 percent by weight, based on the total dry weight of the impregnated sheet, and then dried to a stage where the volatile content is between about 2 weight percent to 10 weight percent. It is essential to have at least about 30 weight percent resin in the barrier sheet, so that the barrier resin can effectively act to prevent phenolic resin flow to the top of the laminate during high pressure consolidation. If phenolic resin in core 11 is allowed to contact the vinyl ester terminated bisphenol A epoxy resin, the epoxy resin will inhibit top surface cure to the "C"-stage, i.e., to the completely infusible and cured stage, and allow degradation of the print layer 13 by strong chemicals.

The core layer sheets are impregnated with a solution of phenolic resin to give a resin content between 20 percent and 40 percent by weight, based on the total dry weight of the impregnated sheet, and then dried to a stage at which the resin is only partly cured and has a volatile content between about 4 weight percent to 15 weight percent. All of such dried or partially cured resins in the sheets are in the "B"-stage, i.e., dry to the touch but flowable under heat and pressure during the heat and pressure lamination procedure, and capable of final cure.

Again referring to the FIGURE, the print sheet 13 can have a dual resin treatment achieved by first impregnating the print alpha cellulose with an aminotriazine-aldehyde impregnating resin solution, having a viscosity of between about 25 cps. and 200 cps. at 25° C., by a dip and squeeze process, followed by immediately metering a solution of a vinyl ester terminated bisphenol A epoxy resin, having a viscosity of between about 400 cps. and about 800 cps. at 25° C., onto the wet impregnating resin. Then the dual treated sheet is heated in a forced air oven to "B"-stage the resin, driving off volatiles. The vinyl ester terminated bisphenol A epoxy will penetrate up to ¼ of the thickness of the print sheet, as shown at point 18, traveling along the fibers 16, filling any voids present and mixing to some degree with the aminotriazine-aldehyde resin.

Standard print sheets are about 8 mil thick (0.008") and in this process, the vinyl ester terminated epoxy will impregnate the top of the print sheet mingling with the other resin to a depth of at least about 1 mil, with maximum impregnation of about 4 mils; additionally, a surface coating 17, at least about 1 mil and usually about 3 mils thick will be formed. Maximum coating thickness is about 5 mils. During heat and pressure laminating there will be even more intermingling, interaction, and combination of the vinyl ester terminated epoxy and the aminotriazine-aldehyde resins, with possible reactions between the methylol groups of the melamine and the secondary hydroxyl groups of the epoxy.

In the low cost method, the vinyl ester terminated bisphenol A epoxy resin will simply be coated onto the print sheet 13, whereupon the resin will impregnate the print sheet to a depth of about 6 to 8 mils, i.e., substantially through the sheet with a surface coating of at least about 1 mil, usually about 2 mils remaining. Any voids at the bottom of print sheet 13 will be filled by melamine resin from barrier sheet 12 during lamination. The vinyl ester epoxy resin must have a viscosity of over about 400 cps. at 25° C. for a continuous coating layer 17 to be formed.

As previously mentioned, the barrier sheet 12 is optional, and can be eliminated if the print sheet 13 has sufficient blocking aminotriazine-aldehyde resin between the epoxy and the phenolic resin. Additionally, in another embodiment of the invention, where the print sheet is not a solid color but is a pattern, such as a wood grain or marble pattern, an aminotriazine-aldehyde impregnated alpha-cellulose decorative print sheet can, referring to the FIGURE, be disposed at position A, over phenolic impregnated core B, and below a resin treated protective overlay sheet C. In this case, the pattern is printed on the print sheet surface and is more susceptible to wear than a solid colored print sheet having pigment throughout its cross section, and must be protected by an overlay layer.

The overlay C, described previously, will be made the same way as covered layer 13 described previously, except that no pattern, dye or pigment will be used in the sheet. In the instance of a patterned laminate comprising impregnated protective overlay C, melamine impregnated print A, and phenolic impregnated core B, as in the situation described previously, a Kraft paper or alpha-cellulose paper sheet impregnated by an aminotriazine-aldehyde resin can be used as a barrier layer at point D, such layer not shown in the FIGURE.

The vinyl ester terminated diglycidyl ether of bisphenol A based epoxy resin used as the coating and impregnating resin in this invention has the general structural formula:

these temperatures, to effect a cure of the resinous components of the assembly will usually be from about 3 minutes to about 25 minutes. The resulting laminate is generally allowed to cool to between about 50° C. to 85° C. before being removed from the press. The cooling step generally takes between about 30 minutes to 90 minutes. Generally, the assembly will require a 15 minute to 45 minute warm-up period before the 120° C. to

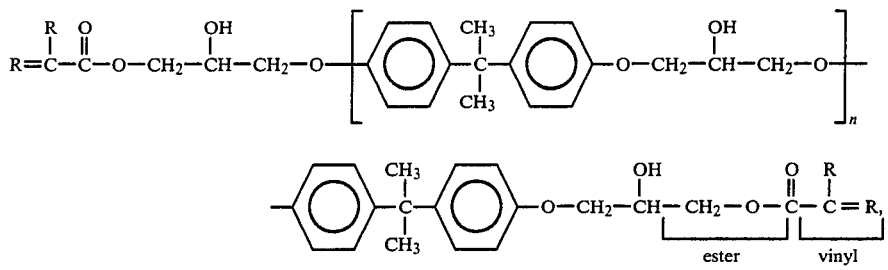

where each R can individually be alkyl from 1 carbon to 6 carbons, n is from about 1 to about 3, and the bottom chain is attached to the top chain. Most preferably, R will be $CH_2$ or $CH_3$, and the resin will have the general structural formula:

175° C. maximum curing temperatures are reached in the press. The entire cycle of warm-up, cure and cooling will vary between about 50 minutes to 160 minutes. Release sheets, such as non-adherable aluminum foil, can be used between the laminate lay-up and the press

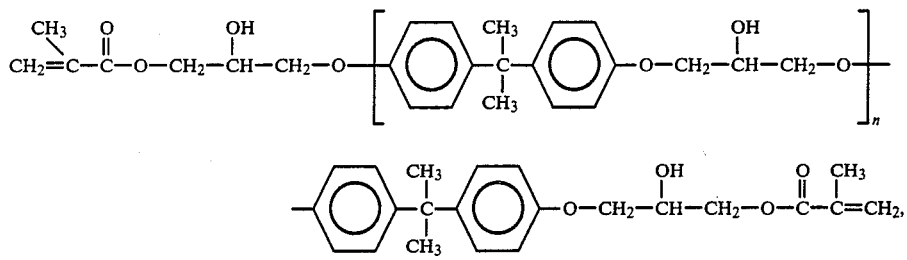

where n is from about 1 to about 3. These materials are commercially available, usually in styrene solution.

It is essential that the viscosity of the vinyl ester terminated epoxy range only from about 400 cps. to about 800 cps. at 25° C., corresponding to a styrene solvent content of no more than about 45% by weight, otherwise layer 17 in the Drawing will not continuously form to a thickness of from 1 mil to 5 mils and the fibers in the top surface will not be completely protected from contacting harsh chemicals. The resin is generally applied in the range of about 10 grams to about 25 grams per square foot of top laminate surface.

Well known thixotroping agents, such as submicroscopic fumed silica, having hydrogen bonding between $SiO_2$ particles, 70 angstroms to 500 angstroms in diameter, sintered together in chain-like formations, can be used in effective amounts, usually in the range of from about 0.5 wt.% to about 2 wt.% based on weight of vinyl ester terminated epoxy resin solids. Additionally, suitable catalysts for the vinyl ester terminated epoxy resin, such as various peroxides, napthenates and the like, can be used in effective amounts, usually in the range of from about 0.5 wt.% to about 2 wt.% based on the weight of vinyl ester terminated epoxy resin solids.

Although low pressure laminating techniques can be used with the previously described stack-ups, high pressure techniques are most suitable to insure chemical resistance. Temperatures ranging from about 120° C. to about 175° C., and pressures ranging from about 600 psi. to 2,000 psi. can be employed. The time required, at surface.

EXAMPLE 1

Kraft paper core stock was impregnated with a standard phenol-formaldehyde resin solution by a continuous dip and squeeze process, dried to the "B"-stage in a forced air oven at about 110° C., and then cut into 12 inch by 12 inch sections. High quality alpha-cellulose paper stock was impregnated with a standard melamine-formaldehyde resin solution by a continuous dip and squeeze process, to give a resin content of about 62 weight percent, i.e., a treated ratio of 2.7, dried to the "B"-stage in a forced air oven at about 110° C., and then cut into 12 inch by 12 inch sections, for use as barrier sheets.

The epoxy resin was then prepared: to 1,000 grams of vinyl ester terminated diglycidyl ether of bisphenol A epoxy in 45 weight percent styrene solution, having a viscosity at 25° C. of 500 cps. (sold commercially by Shell Chemical Co. under the trade name EPOCRYL 322), 8 grams of a 60% solution of methyl ethyl ketone peroxide and 1 gram of a 6% solution of cobalt naphthenate catalysts were added and blended. The resulting resin mix had a gel time of 3 minutes at 93° C. and a pot life of about 3 hours at 25° C.

High quality, solid white pigmented 10 gram per square foot basis alpha-cellulose paper print stock, was first impregnated with a melamine-formaldehyde resin solution by a continuous dip and squeeze process, to give a resin content of about 35 weight percent, i.e., a treated ratio of 1.56. Then, before any drying, the melamine impregnated print stock was coated with the vinyl ester terminated epoxy solution previously described, by metering out a resin solution bead across the moving impregnated print stock. The vinyl ester terminated epoxy coating weight was from about 13.2 to about 14.8 grams per square foot of print stock surface, and showed even flow properties.

The epoxy resin could be seen to soak somewhat into the print stock surface as it passed to a 40 foot drying oven with a temperature range of from about 108° C. to about 120° C., at a speed of 78 inches per minute, to "B"-stage both the melamine and the epoxy resin. This method produced dual resin coated and impregnated print stock. The print stock was then cut into 12 inch by 12 inch square sheets. The barrier sheets were about 4 mil thick and the print and core sheets were about 8 mil thick each.

A laminate stack-up was then assembled, containing in superimposed relationship: a bottom core layer of six sheets of "B"-staged phenolic impregnated Kraft paper, one middle "B"-staged melamine impregnated alpha-cellulose barrier sheet, and one top, dual, melamine-epoxy treated, 8 mil thick "B"-staged print sheet, having an epoxy penetration into the surface of from about 1 mil to 2 mils and an epoxy coating on the surface of about 3 mils. Thus about 10 mils of melamine resin separated the phenolic resin in the core from the vinyl ester terminated epoxy resin in the print sheet. A velvet texture release sheet was used next to the press plates. This stack-up was molded in a four board pack construction on a standard laminating press for 25 minutes at a platten setting of 150° C. and 1,000 psi. hydraulic pressure. The press was cooled and the completely cured and consolidated laminates removed. The laminates were 1/16 inch (0.15 cm) thick and maintained a 2 mil to 3 mil coating on their surface. They were then tested for completion of cure, and for craze, impact, ultraviolet light resistance, and other physical properties by standard test procedures.

The laminates met all NEMA (National Electrical Manufacturers Association) requirements relating to wear resistance, scuff resistance, impact resistance, dimensional change, boiling water resistance, high temperature resistance, radiant heat resistance, conductive heat resistance, and light resistance. The laminates were additionally tested for chemical resistance by subjecting the surface of the laminates to various chemicals for 24 hours of continuous exposure. The results of the test were that the surfaces were not affected by 10% sodium hydroxide, 50% sodium hydroxide, 70% sulfuric acid, concentrated hydrochloric acid, concentrated phosphoric acid, glacial acetic acid, 90% formic acid, concentrated ammonium hydroxide, potassium permanganate, or acetone. There was a very slight surface effect with methyl Cellosolve, and the surface was moderately to severely affected by concentrated nitric acid and an oakite solution. The majority of the above reagents would affect the surface of a normal decorative laminate to the point that it would not be suitable to be used in an environment where it would be exposed to any of the above-named chemicals for extended time periods.

As can be seen, excellent chemical resistance resulted, making these types of laminates excellent candidates for use in chemical laboratories and the like environments. Even better flow properties were experienced when 0.75 weight percent of fumed silica (Cabot Corporation Cab-O-Sil) was added to the vinyl ester terminated epoxy to provide thixotropic properties without altering viscosity substantially.

EXAMPLE 2

Laminates similar to those produced in Example 1 were made, using the same core sheets and core impregnating resin, the same barrier sheet and barrier impregnating resin and the same print sheet and print sheet impregnating-coating resins, except that: a higher basis weight print paper was used, i.e., 16.8 grams per square foot; the melamine resin content in the print sheet was 43 weight percent, i.e., a treated ratio of 1.76; and 10 grams of benzoyl peroxide catalyst dissolved in 80 grams of acetone was used per 1,000 grams of EPOCRYL 322, providing a vinyl ester terminated bisphenol A epoxy resin solution having a longer pot life, i.e., 48 hours at 25° C. Laminates were made and tested as in Example 1, with similar outstanding results.

EXAMPLE 3

A low cost laminate was made, eliminating expensive melamine impregnant in the top print sheet layer. The same core layer and 4 mils thick barrier layer were used as described in Example 1, using the same impregnants and resin contents. In this instance, 10 grams per square foot basis, high quality, white pigmented alpha-cellulose paper print stock was simply coated on the top side with the 500 cps. solution of EPOCRYL 322 described in Example 1. The vinyl ester terminated epoxy coating weight was about 18 grams per square foot of print sheet surface, higher than in Example 1. The epoxy resin could be seen to soak into the print stock surface as it passed to the drying oven. The print was "B"-staged as in Example 1. A laminate stack-up was then assembled and heat press laminated as in Example 1. The "B"-staged print sheet had an epoxy penetration of from about 6 mils to 8 mils and an epoxy coating on the surface of about 2 mils. After lamination the specimens were 1/16 inch (0.15 cm) thick, and maintained about a 1 mil to 1.5 mils coating on their surface. The laminate specimens were tested as in Example 1, with similarly outstanding results except for 20% less abrasive resistance. This abrasion level, however, was still 2.5 times NEMA requirements for high pressure decorative laminates. This laminate had outstanding chemical resistance and would be economically competitive.

COMPARATIVE EXAMPLE 4

A laminate was made exactly as in Example 3, except that melamine-formaldehyde resin was substituted for EPOCRYL 322 as a print sheet impregnant. Here the melamine viscosity was about 50 cps. at 25° C., and surface coating was minimal. Laminate specimens were tested as in Example 1. The results were that the laminate was severely attacked by strong bases, strong acids, oxidizing agents and lab cleaning solutions. Having a 1 mil to 3 mils coating would not have helped since melamine resin is not corrosive resistant.

We claim:

1. A resin impregnated and resin coated, fibrous, cellulosic, heat and pressure consolidated, chemical resistant laminate, said laminate comprising a plurality of cellulosic sheets and having a bottom portion impregnated with phenol-aldehyde resin, a top portion impregnated at least about 1 mil deep and coated at least about 1 mil thick with vinyl ester terminated bisphenol A epoxy resin, and a middle portion impregnated with aminotriazine-aldehyde resin, where the aminotriazine-aldehyde resin contacts the vinyl ester terminated bisphenol A epoxy resin and functions as a barrier to phenolic resin contact with the vinyl ester terminated bisphenol A epoxy resin.

tions as a barrier to phenolic resin contact with the vinyl ester terminated bisphenol A epoxy resin, and where the vinyl ester terminated bisphenol A epoxy resin has the structural formula:

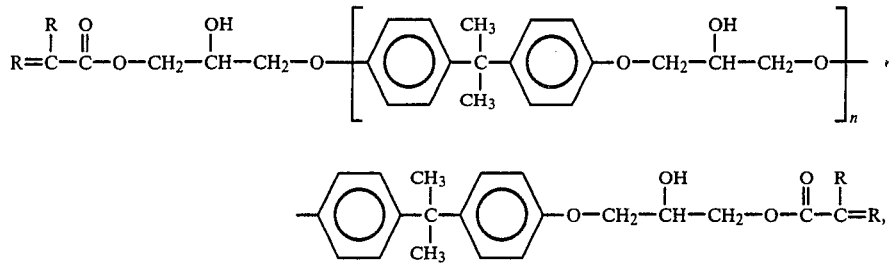

where each R is alkyl from 1 carbon to 6 carbons, and n is from about 1 to about 3.

2. The chemical resistance laminate of claim 1, where the vinyl ester terminated bisphenol A epoxy resin is applied as a solution having a viscosity of between about 400 cps. and about 800 cps. at 25° C.

3. The chemical resistant laminate of claim 1, where the aminotriazine-aldehyde resin is a melamine-formaldehyde resin, the phenol-aldehyde resin is a phenol-formaldehyde resin, the vinyl ester terminated bisphenol A epoxy resin has up to about 2%, based on vinyl esther terminated bisphenol A epoxy solids, of a thixotroping agent, and the vinyl ester terminated bisphenol A epoxy resin mixes with the melamine formaldehyde resin.

4. A resin impregnated and resin coated, fibrous, cellulosic, heat and pressure consolidated, chemical resistant decorative laminate made of a plurality of cellulosic sheets and comprising:
  A. a bottom core portion impregnated with phenol-aldehyde resin, and
  B. a top decorative portion impregnated and coated with resin, where the part of the decorative portion facing the core is impregnated with aminotriazine-aldehyde resin and the top part of the decorative portion is impregnated at least about 1 mil deep and coated at least about 1 mil thick with vinyl ester terminated bisphenol A epoxy resin, where the aminotriazine-aldehyde resin contacts the vinyl ester terminated bisphenol A epoxy resin, and func- 5. The chemical resistant laminate of claim 4, where the vinyl ester terminated bisphenol A epoxy resin impregnates into the top of the decorative portion, mixing with the aminotriazine-aldehyde resin.

6. The chemical resistant laminate of claim 4, where the vinyl ester terminated bisphenol A epoxy resin is applied as a solution having a viscosity of between about 400 cps. and about 800 cps. at 25° C.

7. The chemical resistant laminate of claim 4, where the aminotriazine-aldehyde resin is a melamine-formaldehyde resin, the phenol-aldehyde resin is a phenol-formaldehyde resin, and the vinyl ester terminated bisphenol A epoxy resin has up to about 2%, based on vinyl esther terminated bisphenol A epoxy solids, of a thixotropic agent.

8. The chemical resistant laminate of claim 4, where a fibrous barrier layer impregnated with aminotriazine-aldehyde resin is disposed between the core and the decorative portion, where the barrier layer has a resin content of at least about 30 weight percent.

9. The chemical resistant laminate of claim 4, where the vinyl ester terminated bisphenol A epoxy resin has the structural formula:

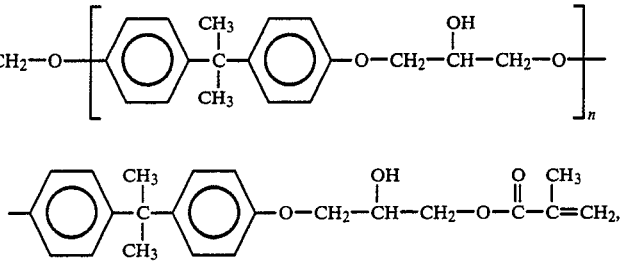

where n is from about 1 to about 3.

10. The chemical resistant laminate of claim 1, where the vinyl ester terminated bisphenol A epoxy resin has the structural formula:

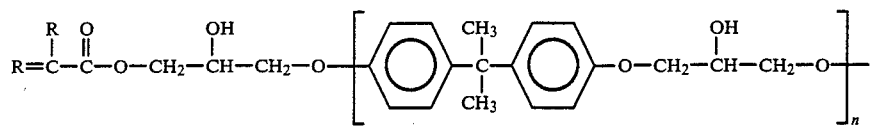

-continued

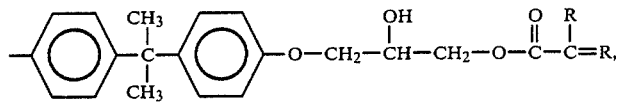

where each R is alkyl from 1 carbon to 6 carbons, and n is from about 1 to about 3.

11. The chemical resistant laminate of claim 1, where the vinyl ester terminated bisphenol A epoxy resin has the structural formula:

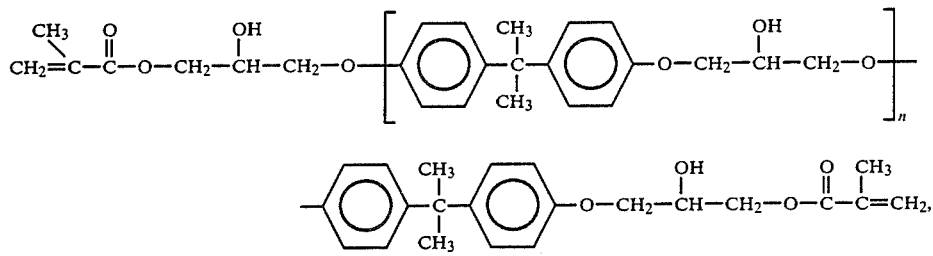

where n is from about 1 to about 3.

12. A resin impregnated and resin coated, fibrous, cellulosic, heat and pressure consolidated, chemical resistant decorative laminate made of a plurality of cellulosic sheets and comprising:
  A. a bottom core layer impregnated with phenol-aldehyde resin,
  B. a middle layer impregnated with aminotriazine-aldehyde resin, and
  C. a top protective overlay layer impregnated at least about 1 mil deep and coated at least about 1 mil thick with vinyl ester terminated bisphenol A epoxy resin, where, the aminotriazine-aldehyde resin in the middle layer functions as a barrier to phenolic resin contact with the vinyl ester terminated bisphenol A epoxy resin, and where the vinyl ester terminated bisphenol A epoxy resin has the structural formula:

where each R is alkyl from 1 carbon to 6 carbons, and n is from about 1 to about 3.

13. The chemical resistant laminate of claim 12, where the top overlay layer is initially impregnated with aminotriazine-aldehyde resin, the vinyl ester terminated bisphenol A epoxy resin impregnates into the top portion of the overlay layer, mixing with the aminotriazine-aldehyde resin.

14. The chemical resistant laminate of claim 12, where the vinyl ester terminated bisphenol A epoxy resin is applied as a solution having a viscosity of between about 400 cps. and about 800 cps. at 25° C., and the middle layer is a decorative patterned print layer.

15. The chemical resistant laminate of claim 12, where the aminotriazine-aldehyde resin is a melamine-formaldehyde resin, the phenol-aldehyde resin is a phenol-formaldehyde resin, and the vinyl ester terminated bisphenol A epoxy resin has up to about 2%, based on vinyl esther terminated bisphenol A epoxy solids, of a thixotropic agent.

16. The chemical resistant laminate of claim 12, where the vinyl ester terminated bisphenol A epoxy resin has the structural formula:

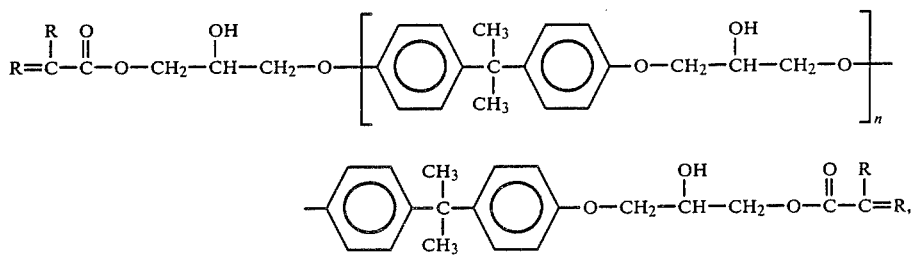

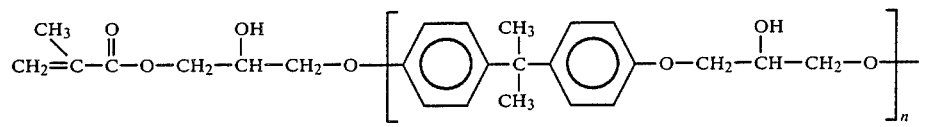

where n is from about 1 to about 3.

* * * * *